United States Patent
Hines, Jr.

(10) Patent No.: US 8,177,110 B1
(45) Date of Patent: May 15, 2012

(54) TRUCK UTILITY BOX

(76) Inventor: Robert S. Hines, Jr., Unicoi, TN (US)

( * ) Notice: Subject to any disclaimer, the term of this patent is extended or adjusted under 35 U.S.C. 154(b) by 771 days.

(21) Appl. No.: 12/286,946

(22) Filed: Oct. 4, 2008

Related U.S. Application Data

(60) Provisional application No. 61/000,392, filed on Oct. 25, 2007.

(51) Int. Cl.
*B60R 9/00* (2006.01)

(52) U.S. Cl. ........ 224/404; 224/403; 224/548; 224/554; 296/37.6; 410/104

(58) Field of Classification Search ............... 224/404, 224/281, 282, 310, 548, 402, 403, 554; 296/37.6; 410/104; 280/769; 211/94.01, 162
See application file for complete search history.

(56) References Cited

U.S. PATENT DOCUMENTS

| | | | | |
|---|---|---|---|---|
| 4,828,121 A * | 5/1989 | Willcocks, Jr. | ............ | 211/94.01 |
| 4,850,769 A * | 7/1989 | Matthews | ............... | 410/105 |
| 5,037,153 A * | 8/1991 | Stark | ............... | 296/37.6 |
| 5,228,736 A * | 7/1993 | Dutton | ............... | 296/39.2 |
| 6,007,128 A * | 12/1999 | Hines, Jr. | ............... | 296/37.6 |
| 6,007,129 A * | 12/1999 | Kearney, Jr. | ............... | 296/37.6 |
| 6,253,976 B1 * | 7/2001 | Coleman et al. | ............... | 224/404 |
| 6,264,083 B1 * | 7/2001 | Pavlick et al. | ............... | 224/404 |
| 6,328,364 B1 * | 12/2001 | Darbishire | ............... | 296/26.09 |
| 6,712,568 B2 * | 3/2004 | Snyder et al. | ............... | 410/104 |
| 7,819,295 B2 * | 10/2010 | Plavetich | ............... | 224/403 |

* cited by examiner

*Primary Examiner* — Justin Larson
*Assistant Examiner* — Steven M Landolfi, Jr.

(57) ABSTRACT

A utility box structure for pick-up trucks and the like, wherein a guide rail of the structure is adapted for mounting on the top rim of the sides and front of the cargo body of the vehicle within the cargo bay thereof, wherein the box is affixed to rail follower means mounted within the guide rail structure whereby the box can be moved by hand along the guide rail structure to easily position the box at the front or at either side of the cargo bay or at any location therebetween.

5 Claims, 2 Drawing Sheets

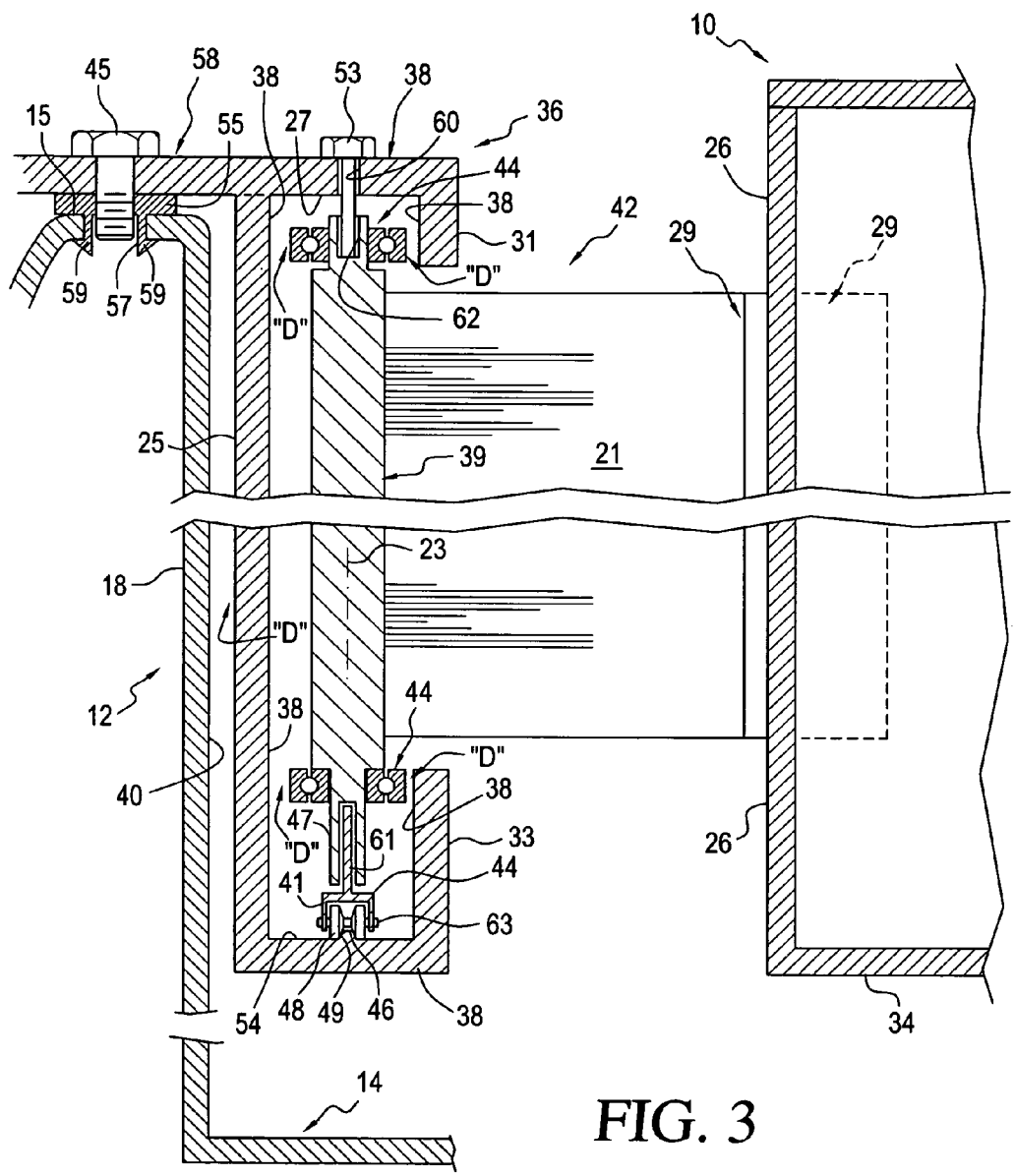
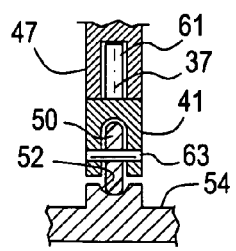
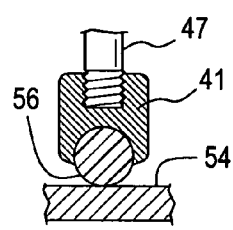
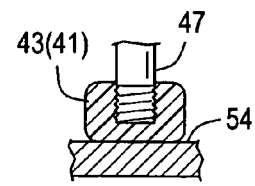
FIG. 3
FIG. 4  FIG. 5  FIG. 6

TRUCK UTILITY BOX

This application claims priority under 35 U.S.C. 119(e)(1) based on Applicants Provisional U.S. Patent Application Ser. No. 61/000,392 filed Oct. 25, 2007 and titled "TRUCK UTILITY BOX".

BACKGROUND

1. Field

This invention is directed to a truck or other vehicle utility box or other such container for carrying tools, equipment, machine parts or other such items, which container is moveable side-to front-to side of a cargo bay, e.g., of a pick-up truck cargo bed with minimal bed encroachment and with maximum ease of container usage.

2. Prior Art

Heretofore, truck utility boxes have shown limited utility in that they have either been affixed to the front or side of a truck bed or have been pivotally mounted on a fixed pivot as shown in U.S. Pat. No. 6,007,128, whereby the front or the selected side location of the box is not, in many instances, a convenient one for the user to access.

The present invention markedly enhances the utility of such boxes by allowing the user to easily move the box, regardless of its weight, to a more accessible location within the truck cargo area.

SUMMARY OF THE INVENTION

The invention in one preferred embodiment comprises a container unit adapted for connection to the cargo body of a vehicle having a cargo bed bordered by a front wall and side walls, the walls forming a top rim of the cargo body, the container unit having the main components of an item containment box and a mounting structure therefor, the box comprising opposing end, side and floor portions, the mounting structure comprising rail (track) means having plate means adapted for mounting on the top rim and having a travel guide section adapted for being positioned adjacent inside portions of the cargo body walls, travel guide follower means affixed to the end portions of the box and having guide follower structures mounted within the guide section for guided movement therealong for positioning the box in any desired location along the rail means.

BRIEF DESCRIPTION OF THE DRAWINGS

The invention and its objects will be understood further from the drawings herein of preferred structures and their descriptions wherein:

FIG. 3 is a cross-sectional view taken generally along line 3-3 in FIG. 1; and

FIGS. 4, 5 and 6 are cross-sectional views of alternative designs of the bottom thrust bearing device, (roller or the like) of the guide follower means.

DETAILED DESCRIPTION

Figure 1:
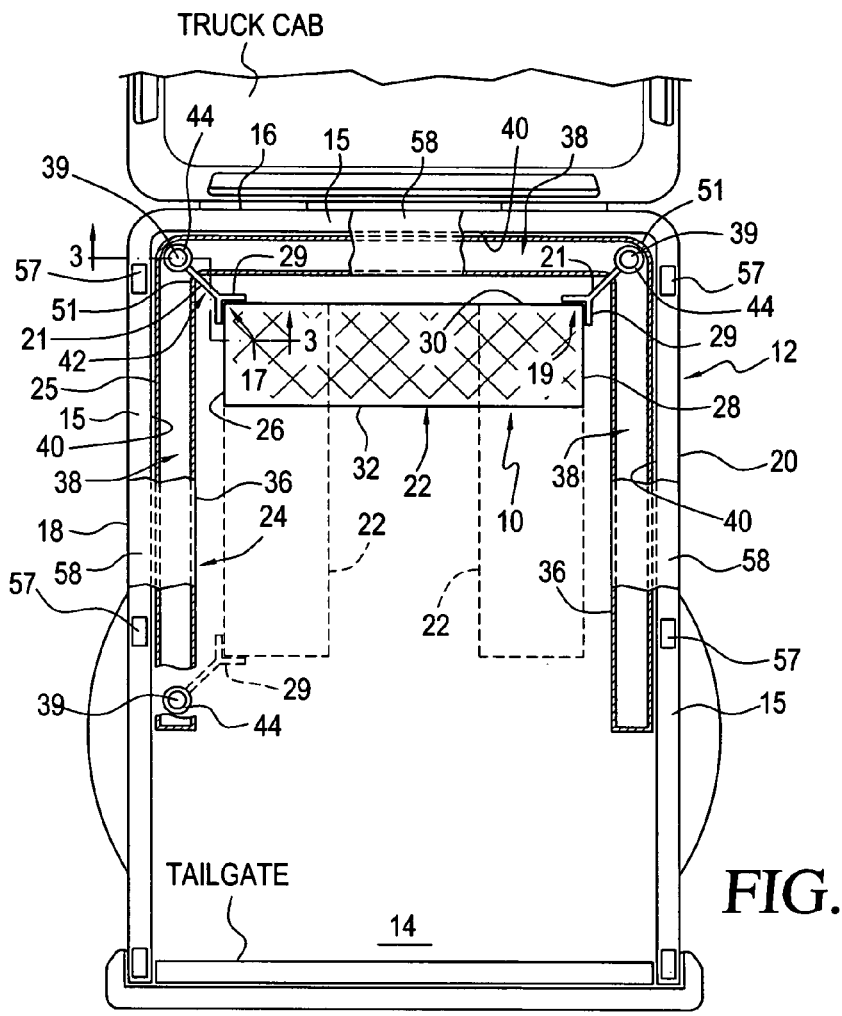
FIG. 1 is a top-down view taken generally along line 1-1 of FIG. 3, with portions broken away for clarity of a pick-up truck cargo bed (bay) with the present container unit shown positioned adjacent the front wall thereof, and with other box locations shown by dotted lines.
Figure 2:
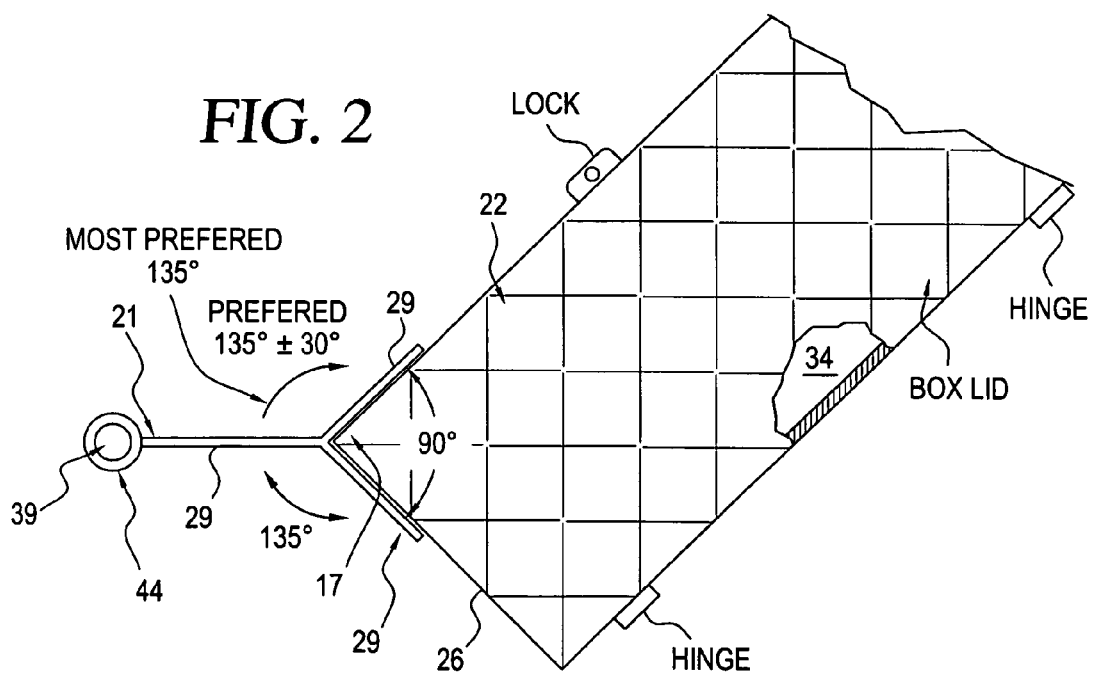
FIG. 2 is a top-down view of the box of FIG. 1 showing further details of its connection to the guide follower means including preferred connection angles.

Referring to the drawings and to the claims herein, the present container unit 10 is adapted for connection to the cargo body 12 of a vehicle having a bed 14 bordered by a front wall 16 and side walls 18, 20, said walls forming a top rim 15 of said body. The container unit has the main components of an item containment box 22 and a mounting structure 24 therefor. The box comprises opposing end 26, 28, side 30, 32 and floor 34 portions. The mounting structure 24 comprises rail means generally designated 36 adapted for mounting on top rim 15 and has a travel guide section generally designated 38 adapted for positioning adjacent inside portions 40 of the cargo body walls. A pair of travel guide follower means generally designated 42 are each provided with a bracket section 29 affixed to an end portion 26, 28 of the box and each of 42 has a guide follower 44 mounted on a shaft 39 on said bracket section within said guide section 38 for movement therealong for positioning said box in any desired location along rail means 36.

Each guide follower 44 shown in FIG. 3 preferably comprises a top and bottom pair of roller bearings or equivalent means affixed to shaft 39 which is provided at its bottom end 47 with a thrust bearing means such as roller 48 as on a caster type of device 41. A guide ridge (track) 46 on the floor 54 of 38, and groove 49 in the roller will assist in proper orientation of the roller as it negotiates the corners 51 of guide section 38. As shown in FIG. 4, a caster type wheel 50 may be pivotally mounted on 47 and adapted to loosely ride in a groove 52 in the floor 54 of guide section 38. It is preferred that the axis 37 of the caster shaft 61 be coincident with the axis of wheel shaft 63.

In FIG. 5, a Nylon, Teflon or the like ball 56 is rotatably mounted on 47, and would provide smooth travel of guide follower 44 in any direction including around sharp corners of 38.

In FIG. 6 the thrust bearing means comprises a slippery member 43 of Nylon, Teflon or the like which can support the weight of the box and travel guide follower means 42 and still readily slide on floor 54, particularly where, e.g., the floor is of polished stainless steel or the like.

It is noted that the exaggerated clearances such as "D" shown in FIG. 3 between the various structures, e.g., between 44 and 38 are only for purposes of clarity and in practice the clearances would be only a few thousandths or a fraction of an inch.

Referring further to FIG. 3, the upper mounting plate section 58 of rail means 36 can be continuous (preferably) the full length of 36 or can be as spaced sections along 36, and is affixed to the top rim 15 or other equivalent cargo body structure by any means such as drilling and tapping the rim to receive bolts, screws or the like, or welding 58 to 15, but preferably by means of bolting 45 the plate 58 thru a nut device such as self locking nut 55 having snap out, spring like locking fingers 59 which can be knocked thru the stake holes 57 typically provided, e.g., in the top rim of pick-up truck cargo bodies. Also, as shown in FIG. 3 a box positioning stop is shown as a removable pin 53 which can be dropped thru a hole 60 provided in any number of desired locations along guide section 38 in plate 58 and into a hole 62 formed in the upper end of a shaft 39 in order to temporarily lock the box position against any inopportune movement.

In a preferred claimed (claim 2) embodiment of the present assembly with the various structures numbered for clarity said box 22 is substantially rectangular and comprises opposing ends 26, 28 inner 32 and outer 30 opposing sides and a floor 34, wherein said rail follower structure 42 comprises a pair of brackets 29, one each affixed to an outer corner portion 17, 19 of said box and each having a web portion 21 extending outwardly from its associated corner portion and each carrying a shaft 39, having a longitudinal axis 23 oriented substantially vertically, rotatable bearing means 44 on an upper end portion and on a lower end portion of each said shaft with their rotation axis coincident with said longitudinal axis of said shaft, thrust bearing means 42 on each said lower end portion and adapted to carry substantially all the weight of said box and its contents, and wherein said travel guide section comprises the interconnected components of an outer substantially vertically oriented wall section 25, a ceiling section 27, a floor section 54, and upper 31 and lower 33 inner substantially vertically oriented wall sections which are spaced apart vertically to accommodate said web portions.

The invention has been described in detail with particular reference to preferred embodiments thereof, but it will be understood that variations and modifications will be effected with the spirit and scope of the invention.

I claim:

1. A utility box assembly of guide rail structure and container box structure for mounting on pick-up trucks and the like vehicles which have a cargo bay comprised of a substantially rectangular floor having front and side edge portions, a side panel extending upwardly from each said side edge portion of said floor, and a lateral front panel extending upwardly from said front edge portion of said floor, wherein said guide rail structure has a lateral front section and opposing longitudinal side sections adapted for mounting on upper portions respectively of said front and side panels, wherein said guide rail sections form a continuous, open, unencumbered channel structure which runs the length of said guide rail structure, wherein said box structure comprises a generally rectangular floor, opposing side and opposing end sections which form a rectangular box having substantially right angled, vertically oriented end corner portions, a box support arm structure mounted on each of two of said corner portions of said box, wherein the two corner portions are at opposite ends of one side section of said box, said arm structure extending generally horizontally outwardly from each of said two corner portions at a box support angle of from about 105° to about 165° to said one side section of said box, a rail follower structure affixed on an outer end portion of each said arm structure and adapted for being rollably or slidably mounted on said guide rail structure for unimpeded guided movement therealong whereby the box can be moved by hand along the guide rail structure to easily position the box in a front position at the front or in a side position at either side of a cargo bay or at any location therebetween, wherein both rail follower structures are located within one of the side sections of the guide rail structure when the box is in one of the side positions, and wherein at least one of the rail follower structures moves within the front section of the guide rail structure during transition of the box between two of said positions.

2. The assembly of claim 1 wherein said each said outer end portion of each said arm structure comprises vertically oriented shaft means having an upper bearing portion and a lower bearing portion, lateral bearing means on said upper and lower bearing portions and adapted to engage said guide rail structure, thrust bearing means on each said shaft means and adapted to engage said guide rail structure and bear the weight of said box and its contents, and wherein said guide rail structure on which said lateral and thrust bearing means ride comprises interconnected upper and lower channel forming components of an outer substantially vertically oriented wall section, a substantially lateral ceiling section, a substantially lateral floor section, and upper and lower substantially vertically oriented inner wall sections which are spaced apart vertically to provide a gap through which said support arm structure can extend.

3. The assembly of claim 2 wherein said thrust bearing means comprises a horizontal axle mounted wheel which is adapted to roll on said floor section.

4. The assembly of claim 2 wherein said thrust bearing means comprises a sliding plastic block which is adapted to slide on said floor section.

5. The assembly of claim 2 wherein said thrust bearing means comprises a ball shaped structure which is mounted in a socket formed in said lower end portion of said shaft for rolling on said floor section of said guide rail structure.

\* \* \* \* \*